INVENTORS
HANSEL B. MEAD, JR.
& HANS SCHARLA-NIELSEN
BY Hurwitz & Rose
ATTORNEYS INVENTORS
HANSEL B. MEAD, JR.
& HANS SCHARLA-NIELSEN
BY Hurwitz & Rose
ATTORNEYS 3,283,252

R.F. TRANSMITTER HAVING MEANS FOR REMOVAL OF RIPPLE AND LONG TERM VARIATIONS OF OUTPUT STAGE SUPPLY

Hansel B. Mead, Jr., Eau Gallie, and Hans Scharla-Nielsen, Indialantic, Fla., assignors to Radiation Incorporated, Melbourne, Fla., a corporation of Florida Filed Dec. 17, 1963, Ser. No. 331,245
8 Claims. (Cl. 325—186)

Figure 1:
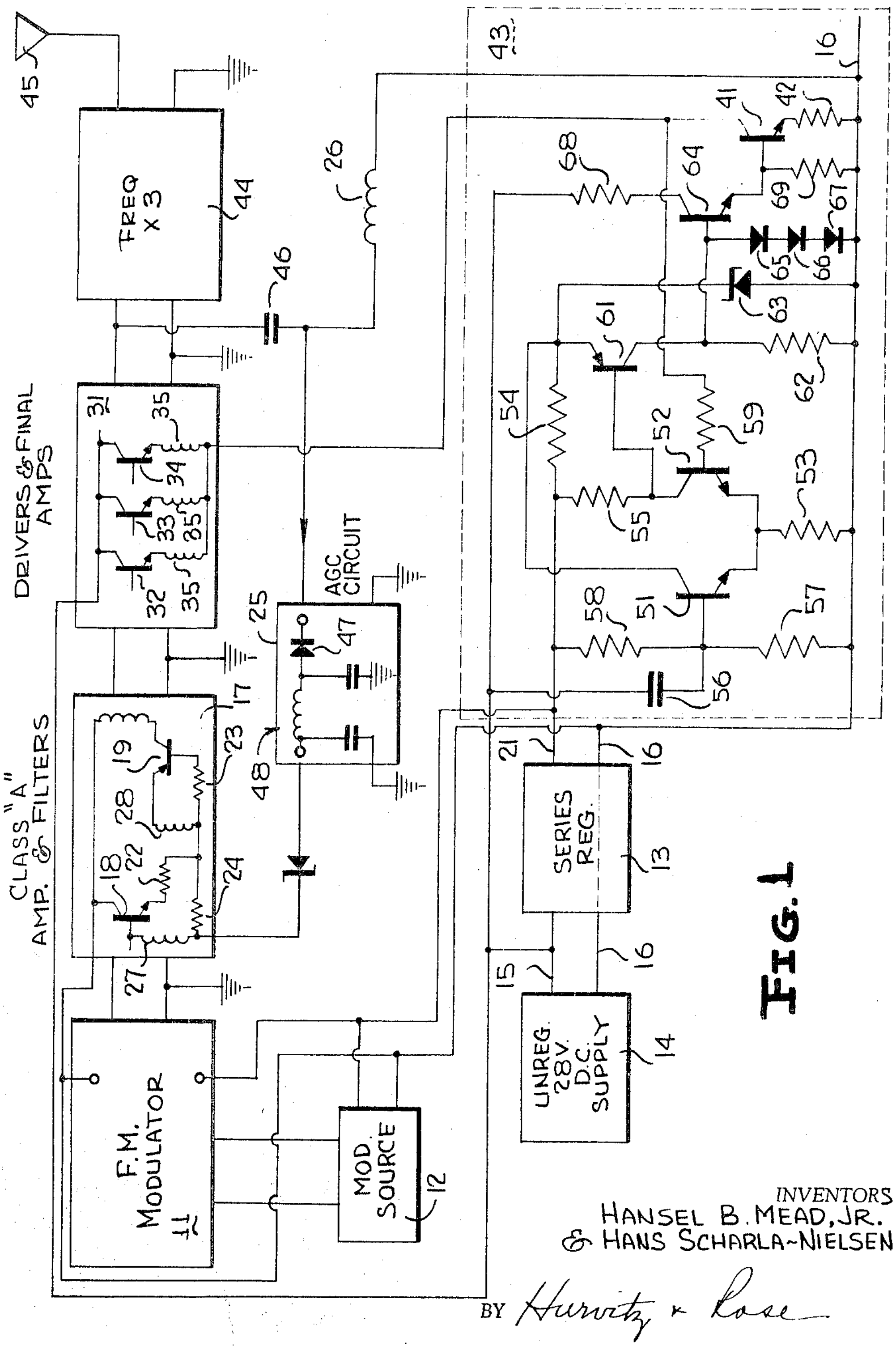

The present invention relates generally to transmitters and more particularly to a transmitter employing an output stage powered by an unregulated supply wherein ripple and long term variations of the output stage supply are removed by means of a ripple stripper and an automatic gain control circuit.

In radio frequency transmitters, it is essential that the power supplied to each of the various stages remains constant. Otherwise, the waveform derived from the transmitter is modulated in accordance with the power variations, an intolerable situation that results in transmission of erroneous information.

It has generally been the practice to provide the required power regulation with series regulators for each of the transmitter stages. For the low power modulator and amplifying stages this approach is quite satisfactory. For the power output stage which requires considerable D.C. energy, however, it causes low power supply efficiency. Low efficiency results from the considerable dissipation in the series regulator elements that must pass all of the current needed by the power output stage and the control circuit that is responsive to a substantial percentage of the D.C. power available.

In accordance with the present invention, the need for a regulated supply feeding the transmitter power output stages is obviated altogether. Instead, the output stages are energized from an unregulated D.C. supply subject to long term voltage fluctuations and ripple introduced from the A.C. generator feeding the D.C. supply.

The long term fluctuations are compensated with the utilization of an automatic gain control (A.G.C.) circuit that derives a control voltage indicative of the signal level deriving from the last power amplifier stage. The control signal is fed back to the linear, low power, amplifying stages preceding the power amplifier to control the linear amplifier gain in a manner to compensate for the changes in gain of the power amplifier.

According to one embodiment of the invention, the A.G.C. control signal is continuously derived and applied to the linear amplifier. The continuous system is feasible with transmitters that emit continuous waves of constant amplitude, such as employed in angle modulated F.M. and P.M. transmission.

With A.M. transmitters, such a scheme is frequently not practical because of the prolonged gaps that occur in energy transmission. Such gaps would cause the linear amplifier gain to increase excessively in response to the A.G.C. signal in a manner whereby total system gain varies considerably, rather than being maintained constant. A further disadvantage with the continuous monitoring system in conjunction with A.M. signals is that the average signal level, such as derived from an A.G.C. circuit, cannot be relied upon to give the degree of regulation required for maintaining the R.F. output power at a constant level. If the A.G.C. response time is long enough to smooth out the gaps and provide a constant amplitude control signal, it frequently will not vary the linear amplifier gain at a fast enough rate to maintain total system gain constant.

For A.M. signals that include a reoccurring amplitude level, such as the sync pulses of a television system or a pulse amplitude modulated telemetry system, the A.G.C. signal however can be utilized to control the linear amplifier gain. This is accomplished by gating the A.G.C. signal to a storage circuit, e.g. a low pass filter, only when the constant amplitude signal is being derived from the transmitter. The storage circuit supplies a constant bias level to the linear amplifier in the interval between reference amplitudes, when A.M. information is being transmitted. In this manner, a transmitted reference level is utilized to control the system gain at a fixed value. Because the constant amplitude recurrence rate is relatively high, the probability of wide power supply fluctuations between adjacent samplings is virtually nil.

In both the continuous and sampled A.G.C. systems, A.C. ripple of the unregulated supply to the power output stages is minimized by a ripple stripper circuit. The ripple stripper includes a D.C. amplifier responsive to the low ripple amplitude of the unregulated supply as referenced to the D.C. and ripple voltages of the power output stages. The signal deriving from the D.C. amplifier is coupled in series with the supply voltage of the output amplifier to eliminate the ripple therein. This circuit has considerably greater efficiency than a series regulator because its control signal is derived by sampling only the low power, unregulated ripple and is then fed through low power consuming stages. In contrast, considerable power is consumed by the control circuits of a conventional series regulator that is responsive to all the energy coupled by the supply to the driven circuit.

A further feature of the invention resides in limiting the current supplied to the power amplifier. Current limiting is necessary to enable the power supply and remainder of the circuit to function properly if a fault to the power amplifier occurs, which fault normally would break a supply fuse. Current limiting is effected by comparing the current supplied to the power amplifier with the conduction point of a diode. To attain the comparison, the voltage across a resistor connected in the power amplifier supply circuit is utilized to control the conduction of a diode shunting the control electrode of a variable impedance in the power amplifier supply circuit. When the voltage across the resistor exceeds a predetermined level, indicative of large currents being drawn by the amplifier, the diode conducts, causing the value of the variable resistor to increase and prevent the further increase of amplifier current.

The current limiter and ripple stripper are included in a single circuit connected in the supply circuit of the power amplifier. Thereby, a single economical system that is not particularly complex is provided to perform both important functions.

It is, accordingly, an object of the present invention to provide a new and improved transmitter.

An additional object of the invention is to provide a new and improved transmitter that is highly efficient and has constant gain.

Another object of the invention is to provide a new and improved transmitter having great power efficiency since it does not require a series regulator for the power output amplifier yet has an R.F. power gain that remains constant for long time periods and is not subject to power supply ripples.

A further object of the invention is to provide a transmitter including an R.F. amplifier, the gain of which is stabilized by an A.G.C. circuit, and a power supply ripple stripper or eliminator, whereby the need for an inefficient series regulator supplying power to the output stage is obviated.

Yet another object is to provide a new and improved transmitter adapted to be utilized with A.M. signals having recurring reference amplitudes, wherein an A.G.C. signal is derived only when the reference amplitude is attained.

It is still a further object of the invention to provide a new and improved circuit for eliminating power supply ripple introduced into circuits.

Yet an additional object is to provide a transmitter employing an A.G.C. system, a power supply ripple stripper and current limiter.

A further object of the invention is to provide a single circuit for eliminating power supply ripple in a circuit and for limiting the amount of current fed to the circuit by the supply.

Figure 2:
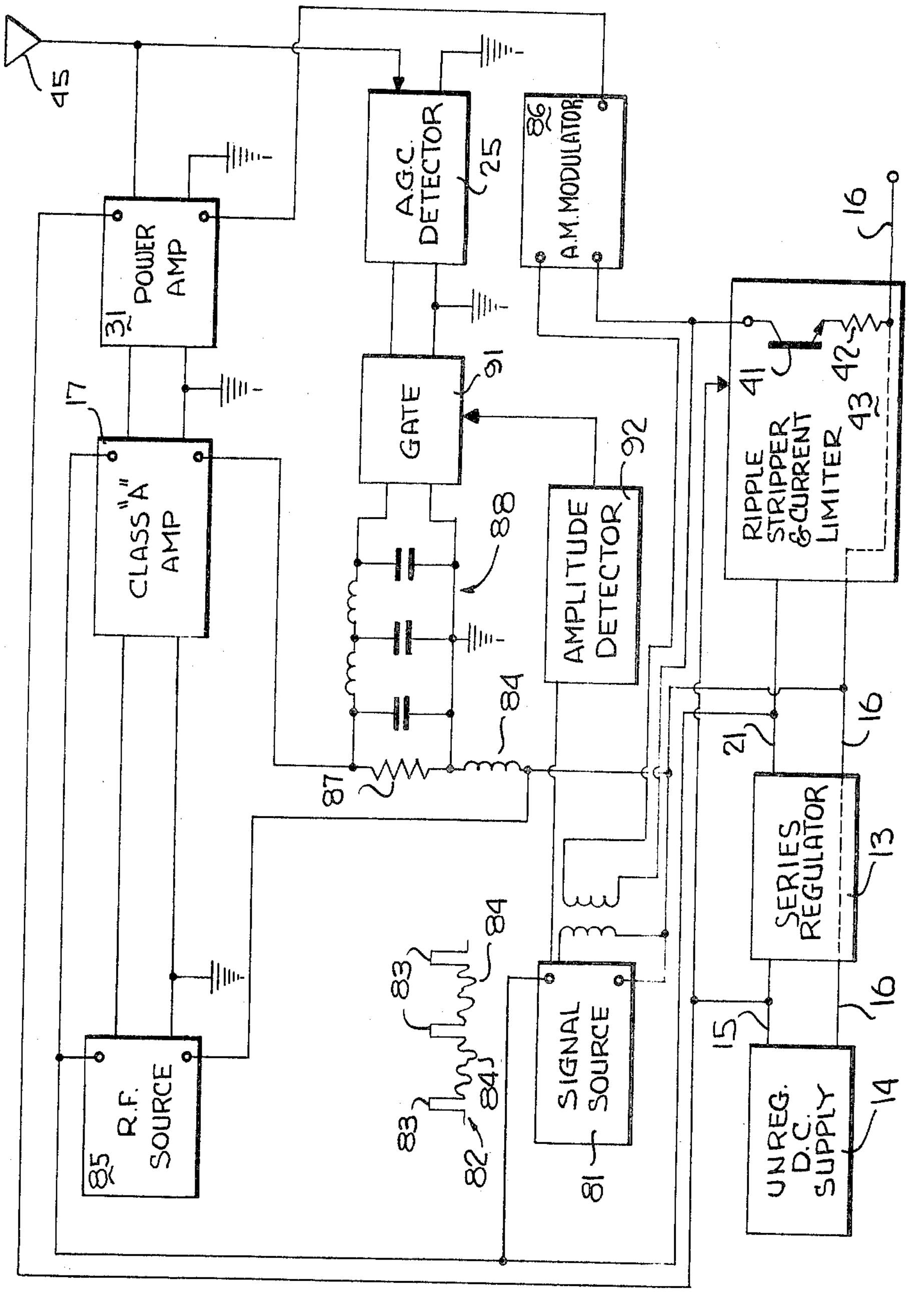

The above and still further objects, features and advantages of the present invention will become apparent upon consideration of the following detailed description of several specific embodiments thereof, especially when taken in conjunction with the accompanying drawings, wherein:

FIGURE 1 is a part schematic, part block diagram of one preferred embodiment of the invention utilizing continuous A.G.C.; and FIGURE 2 is a block diagram of another embodiment utilizing gated A.G.C.

Reference is now made to FIGURE 1 of the drawings wherein F.M. modulator 11 derives a constant amplitude, variable frequency R.F. output in response to the amplitude level of modulation source 12. Modulator 11 and source 12 are supplied with 18 volt regulated, D.C. power that is not subject to ripple or long term variation by series regulator 13. The series regulator is responsive to unregulated 28 volt D.C. power supply 14 of the usual type including a pair of rectifying elements followed by a filter. In consequence, the output voltage of supply 14 on lead 15 relative to common lead 16 is subject to wide long term voltage variations and includes an A.C. ripple voltage having a frequency related to the A.C. power line energizing the supply.

The R.F. signal deriving from modulator 11 is linearly amplified and filtered by element 17. Element 17 includes a class "A" amplifier comprising common emitter and common base transistor stages 18 and 19. Since the R.F. amplifiers employed in the present invention are generally known, R.F. coupling between stages within the amplifiers is not shown, for the sake of brevity and simplicity. The D.C. energization paths, which are important, are shown, however. The bases of NPN transistors 18 and 19 are energized by the regulated voltage on lead 21 deriving from series regulator 13. The common emitter and base electrodes of transistors 18 and 19 are returned to the negative power supply lead 16 via biasing resistors 22 and 23, respectively, resistor 24 and the D.C. path through A.G.C. circuit 25 and choke 26. D.C. paths for supplying biasing currents to the base and emitter of transistors 18 and 19 are provided by choke coils 27 and 28, respectively. Thereby, transistors 18 and 19 are biased such that they are always conducting in the linear region.

The R.F. output deriving from filters and amplifier 17 is supplied to power output amplifier 31. Amplifier 31 includes three cascaded, common emitter stages 32, 33, 34. The first two NPN transistors of amplifier 31 are drivers for the last stage.

Because transistors 32–34 draw considerable current it is not efficient to energize them by means of the regulated voltage deriving from regulator 13 on lead 21. Instead, the unregulated output of supply 14 on lead 15 is applied directly to the collectors of transistors 32–34. The return, D.C. energization path for transistors 32–34 to common power supply lead 16 is through choke coils 35, connected to the transistor emitters, as well as the collector emitter path of NPN transistor 41 and resistor 42 of ripple stripper and current limiter 43.

The constant amplitude, variable radio frequency signal deriving from power amplifier 31 is applied in parallel to frequency multiplier 44 and A.G.C. circuit 25. The frequency multiplier preferably includes a varactor, i.e. a capacitor having its value varied in response to the voltage across it, and a bandpass filter designed to select the third harmonic of the fundamental deriving from the veractor. The output of three fold frequency multiplier is supplied to antenna 45 from which is emitted the F.M. signal.

A small proportion of the R.F. energy deriving from amplifier 31 is applied to A.G.C. circuit 25 via coupling capacitor 46. The R.F. output voltage of amplifier 31 is amplitude detected by diode 47 and filter 48 of the A.G.C. circuit. A.G.C. circuit 25 thereby provides a D.C. voltage that varies the D.C. energization potentials to the bases and emitters of transistors 18 and 19 in amplifier 17. The variable D.C. output voltage of circuit 25 is applied to amplifier 17 in such a manner as to change the gain of amplifier 17 oppositely to the gain changes introduced into amplifier 31 by variations of supply 15.

Consider the situation when the output voltage of supply 15 increases so that the gain, output voltage and power of amplifier 31 increase. In response to the larger amplitude, negative R.F. voltage applied to diode 47 via capacitor 46, the positive D.C. voltage across the capacitors of filter 48 decreases. This decreased voltage is applied almost directly to the base and emitter of transistors 18 and 19 via coils 27 and 28 as well as resistor 24, all having low D.C. impedance. In contrast, the emitter and base voltages of transistors 18 and 19 do not change greatly because of the greater D.C. impedances of resistors 22 and 23. In consequence, the gains of transistors 18 and 19 are lowered as the gains of transistors 32–34 are increased, the total system gain remains constant and the output signal is not subjected to amplitude modulation distortion.

It is thus seen that the feedback network including A.G.C. circuit 25 provides long time gain stabilization for the transmitter system despite variations in the line voltage coupled to supply 14. A.G.C. circuit 25 does not, however, have a sufficiently fast response time to remove the A.C. line ripple from the voltage coupled to amplifier 31 by supply 14. To remove ripple and limit current supplied to amplifier 31, circuit 43 is provided.

Circuit 43 includes a differential amplifier comprising NPN transistors 51, 52 having their emitters connected through a common resistor 53 to negative power supply lead 16. The collectors of transistors 51 and 52 are energized by output lead 21 of series regulator 13 through load resistor 54 and leakage preventing resistor 55, respectively. The base of transistor 51 is supplied with the A.C. ripple voltage of unregulated supply 14 by coupling capacitor 56 and is biased by the tap of the voltage divider comprising resistors 57 and 58 which are connected between regulated leads 16 and 21. Resistors 57 and 58 are selected such that the D.C. voltage applied to the base of transistor 51 is equal to the D.C. voltage sum across transistor 41 and resistor 42 and is of sufficient value as to maintain transistor 51 in class A operation for the peak A.C. voltage swing of the unregulated supply. The base of transistor 52 is supplied by feedback resistor 59 with the ripple variations from the low D.C. voltage side of amplifier 31 as the variations appear across transistor 41 and resistor 42. Thus, there is derived an error voltage across resistor 55 indicative of the ripple deriving from supply 14 referenced to the A.C. and D.C. voltages between the common ends of amplifier 31 and the power supply.

The error voltage deriving from the differential amplifier appearing across resistor 55 is D.C. coupled to the base of current amplifying PNP transistor 61, having its emitter connected to regulated lead 21 via resistor 54 and its collector connected to power supply common 16 via leakage preventing resistor 62. To provide added regulation for the collectors of transistors 51, 52 and 61, Zener diode 63 is connected between the emitter of transistor 61 and lead 16. Transistor 61 amplifies as well as inverts the error voltage and drives a pair of current amplifying NPN cascaded emitter follower stages 64 and 41 via a D.C. coupling path.

Transistors 41 and 64 also limit the current fed by supply 14 to amplifier 31. Diodes 65–67 shunt the base of transistor 64, the collector and emitter of which are energized by the unregulated voltage between leads 15 and 16 via load resistor 68 and leakage preventing resistor 69, respectively. Under normal operation, the total current supplied to amplifier 31 by supply 14 is less than a predetermined value. If a component in amplifier 31 should short circuit or any other fault occurs to amplifier 31 causing its current to exceed this level, the voltage across resistor 42 reaches or goes beyond a certain level. This causes an increase in the base voltages of transistors 41 and 64 to a point where diode 67 begins to conduct, approximately 0.7 volts. Because three diodes are cascaded between the base of transistor 64 and lead 16, the total voltage required to forward bias all of them into conduction is appreciably greater than zero.

In response to conduction of diode 67, a shunt path is provided across the base of transistor 64, whereby the transistor collector emitter current decreases. Insertion of the shunt path causes a decrease in the forward base bias of transistor 41, an increase in the impedance of transistor 41 and reduction in current coupled to amplifier 31 by supply 14. The resulting higher positive voltage at the collector of transistor 41 is reflected as a lower voltage to the base of transistor 64 via the feedback path comprising resistor 59 and transistors 61 and 64. Ultimately increases in total current flowing through amplifier 31 beyond a predetermined value, approximately 30% higher than the normal current drawn by amplifier 31, are prevented by transistor 41 being driven to a high impedance state where it appears as a constant current source in the unregulated path.

In operation, the base of transistor 51 is responsive only to the A.C. ripple voltage deriving from supply 14. The ripple is amplified and inverted by stages 52 and 61, hence is applied to the base of transistor 41 180° out of phase with the ripple of supply 14. In consequence, the impedance of transistor 41 varies synchronously with the ripple voltage between the collectors of transistors 32–35 and lead 16 to nullify the ripple currents and voltages of the transistors in amplifier 31.

That ripple is so nullified may be seen by considering the situation when the ripple voltage is of greatest positive amplitude. At such time, the impedance of transistor 41 is maximum because the voltage applied to its base is a minimum. Because transistor 41 has a large impedance, its base collector current has a tendency to be reduced. This tendency compensates for the opposite effect of the large ripple voltage which is to increase the base collector current of transistors 32–34 and 41.

Only D.C. signal coupling has been utilized in ripple stripper 43 because the possibility of error signal phase shifting, as occurs with A.C. coupling (but not D.C.) must be eliminated. Phase shifting cannot generally be tolerated because the impedance of transistor 41 must be exactly synchronized with the ripple voltage in order to effect ripple cancellation.

Ripple applied to amplifier 31 may be virtually eliminated by selecting resistors 57, 58 and 59 so the input voltages to the bases of differential amplifier transistors 51 and 52 are equal. Such a selection comes about when the resistance of the parallel combination of resistors 57 and 58, $$\frac{R_{57}R_{58}}{R_{57}+R_{58}}$$

equals the resistance of resistor 59. Under these conditions, the amplifier comprising transistors 51, 52, 61, 64 and 41 has unity voltage gain but considerable current gain between the base of transistor 51 and the collector of transistor 41. Because of the voltage feedback through resistor 59, the impedances of transistors 61 and 64 are varied to control the impedance of transistor 41 synchronously and out of phase with the A.C. ripple across the collector emitter path of the latter transistor. It is thus seen that circuit 43 constitutes a bucking voltage source for the A.C. ripple for currents below the value to be limited and a constant high impedance, or constant current source for currents above the value to be limited.

Reference is now made to FIGURE 2 of the drawings wherein the transmitter of FIGURE 1 is modified to handle A.M. signal source 81, having a wave train 82 including constant amplitude reoccuring pulses 83 between which A.M. information 84 exists. Such a wavetrain arises in conjunction with television or pulse amplitude modulated telemetry signals wherein pulses 83 constitute sync or frame pulses. The signal deriving from source 81 amplitude modulates the high power R.F. energy deriving from power amplifier 31. Amplifier 31 is supplied with constant amplitude and frequency R.F. power from R.F. source 85 and linear, class A, R.F. amplifier 17.

As in FIGURE 1, the elements consuming low power, sources 81 and 85, modulator 86 and amplifier 17, are energized by the regulated voltage that is derived from regulator 13 between leads 21 and 16, while the power amplifier is energized by the unregulated voltage between leads 15 and 16 through the series path including transistor 41 and resistor 42 of ripple stripper and current limiter 43. The low voltage side of elements 81, 85 and 86 are all returned directly to the low side of the power supply, lead 16. In contrast, the low voltage end of amplifier 17 is connected to lead 16 via the D.C. path including output resistor 87 of low pass filter 88 and choke coil 89, utilized to isolate the power supply from R.F.

In an A.M. transmitter, it is not feasible to utilize the detected A.G.C. directly to control the gain of amplifier 17 because the detected wave frequently varies too widely to provide the necessary degree of regulation. In consequence, the output level deriving from amplifier 31, as detected by A.G.C. circuit 25, is sampled only when the constant amplitude levels 83 are being generated.

To accomplish sampling, the A.G.C. voltage deriving from detector 25 is fed to low pass filter 88 via gate 91 only when the gate is opened in response to the enabling voltage applied thereto by amplitude detector 92. Amplitude detector 92 generates the enabling voltage only when pulses 83 occur. The intelligence amplitude 84 is always considerably lower than sync pulses 83 so the probability of detector 92 erroneously opening gate 91 is virtually zero.

In operation, filter 88 stores the A.G.C. voltage applied to it by gate 91 for the time period between adjacent pulses 83 because the filter has a relatively long time constant compared to the repetition rate of pulses 83. Thus the voltage across resistor 87 remains constant when intelligence 84 is being transmitted. The voltage across resistor 87 baises the active elements of amplifier 17 in a manner similar to that by which transistors 18 and 19, FIGURE 1, are biased by the A.G.C. circuit. Thereby, the gain of amplifier 17 is adjusted to compensate for gain changes of amplifier 31 as a result of variations to the unregulated supply.

While the A.G.C. system compensates for relatively low frequency power supply drift, it does not effect the higher frequency ripple that must be eliminated. Such ripple is eliminated by ripple stripper and current limiter 43 in exactly the same manner discussed in connection with FIGURE 1.

While we have described and illustrated several specific embodiments of our invention, it will be clear that variations of the details of construction which are specifically illustrated and described may be resorted to without departing from the true spirit and scope of the invention as defined in the appended claims.

We claim:

1. An R.F. transmitter for a modulated carrier comprising an unregulated D.C. power supply subject to ripple and long time variations, means for regulating the voltage deriving from said supply, a low power amplifier responsive to said carrier and energized by the voltage deriving from said regulating means, a high power amplifier cascaded with said low power amplifier and energized directly by the voltage deriving from said supply, means responsive to the signal level deriving from said high power amplifier to control the gain of said low power amplifier to maintain the combined gain of both said amplifiers substantially constant despite long time variations of the voltage deriving from said supply, and means for substantially eliminating the ripple applied to said high power amplifier, the last named means including a circuit for comparing ripple in the voltage deriving from said supply with the resulting short term fluctuations in the supply voltage at said amplifier to derive an error voltage therefrom, voltage variable impedance means in series circuit with said power supply and said high power amplifier, and means for applying said error voltage to said impedance means in such sense as to vary the series impedance between said supply and said high power amplifier to cancel said short term fluctuations.

2. The transmitter of claim 1 wherein said ripple eliminating means further includes means for limiting the current fed by said supply to said high power amplifier to a predetermined level.

3. The transmitter of claim 1 wherein said carrier is angle modulated, and means for continuously feeding the signal deriving from said gain control means to said low power amplifier.

4. An R.F. transmitter for a modulated carrier comprising an unregulated D.C. power supply subject to ripple and long time variations, means for regulating the voltage deriving from said supply, a low power amplifier responsive to said carrier and energized by the voltage deriving from said regulating means, a high power amplifier cascaded with said low power amplifier and energized directly by the voltage deriving from said supply, means responsive to the signal level deriving said high power amplifier to control the gain of said low power amplifier to maintain the combined gain of both said amplifiers substantially constant despite long time variations of the voltage deriving from said supply, and means responsive only to the ripple of the voltage deriving from said supply for substantially eliminating the ripple applied to said high power amplifier, said carrier being amplitude modulated by a signal including a recurring constant amplitude between which A.M. information occurs, storage means, means for feeding said gain control signal to said storage means only when said constant amplitude is transmitted, and means for continuously coupling the signal stored by said storage means to said low power amplifier.

5. An R.F. transmitter for a modulated carrier comprising an unregulated D.C. power supply subject to long time variations, means for regulating the voltage deriving from said supply, a low power amplifier responsive to said carrier and energized by the voltage deriving from said regulating means, a high power amplifier cascaded with said low power amplifier and energized directly by the voltage deriving from said supply, and means responsive to the signal level deriving from said high power amplifier to control the gain of said low power amplifier to maintain the combined gain of both said amplifiers substantially constant despite long time variations of the voltage deriving from said supply, wherein said carrier is modulated by a signal including a recurring constant amplitude between which A.M. information occurs, storage means, means for feeding said gate control signals to said storage means only when said constant amplitude is transmitted, and means for continuously coupling the signals stored by said storage means to said low power amplifier.

6. The combination according to claim 5 further including means for removing ripple applied by said unregulated D.C. power supply to said high power amplifier, comprising a D.C. amplifier; said D.C. amplifier including, a variable impedance having first, second and control electrodes, said first and second electrodes being connected in series circuit with said high power amplifier and said supply, a differential amplifier having one input terminal responsive only to the ripple voltage of said supply and a second input terminal responsive to the potential across said impedance, said differential amplifier deriving a signal indicative of the voltage difference between said first and second input terminals, and means for applying the signal deriving from said differential amplifier to said control electrode to vary the value of said impedance in such a manner as to substantially eliminate the ripple applied to said high power amplifier.

7. The circuit of claim 6 wherein said D.C. amplifier includes means for limiting the current fed by said supply to said high power amplifier.

8. The circuit of claim 6 wherein said limiting means comprises a fixed impedance in said series circuit, second variable impedance means in circuit with said first named variable impedance for controlling the first variable impedance, means for varying said second variable impedance only when the current through said fixed impedance exceeds a predetermined value such that the value of said first variable impedance decreases in response thereto.

References Cited by the Examiner

UNITED STATES PATENTS

| | | | |
|---|---|---|---|
| 1,999,190 | 4/1935 | Hansell | 325—147 X |
| 2,085,125 | 6/1937 | Shaw | 325—159 |
| 2,093,751 | 9/1937 | DeWitt | 332—37 |
| 2,172,453 | 9/1939 | Rose | 325—159 X |
| 2,298,930 | 10/1942 | Decino | 325—159 X |
| 2,563,245 | 8/1951 | Jofeh | 330—69 |
| 2,601,271 | 6/1952 | French et al. | |

FOREIGN PATENTS

| | | |
|---|---|---|
| 104,666 | 8/1938 | Australia. |

DAVID G. REDINBAUGH, *Primary Examiner.*

JOHN W. CALDWELL, *Examiner.*